Figure 4:
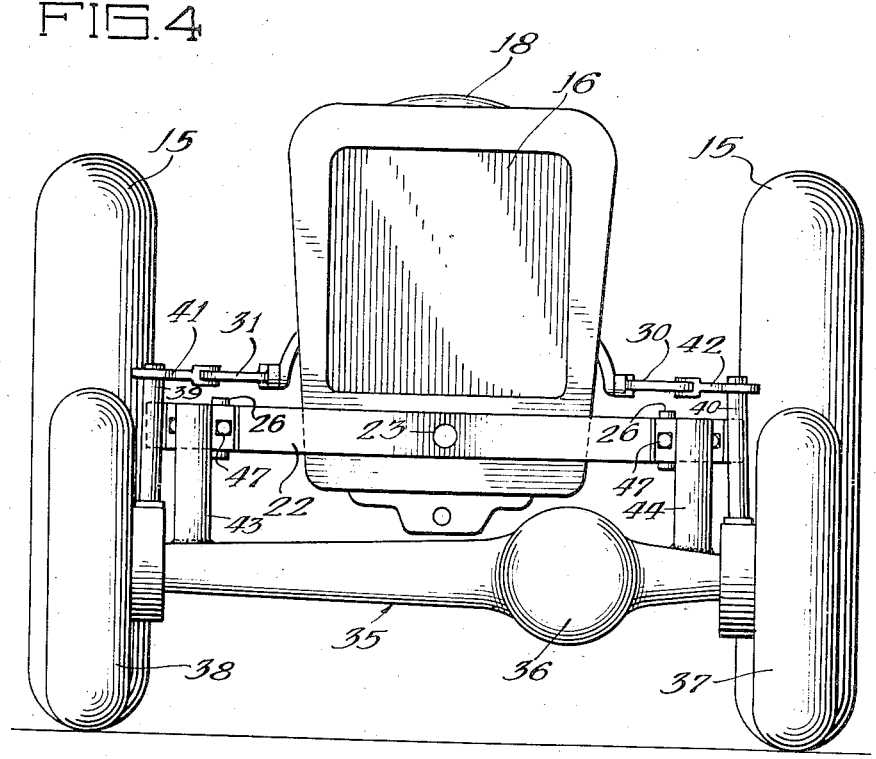

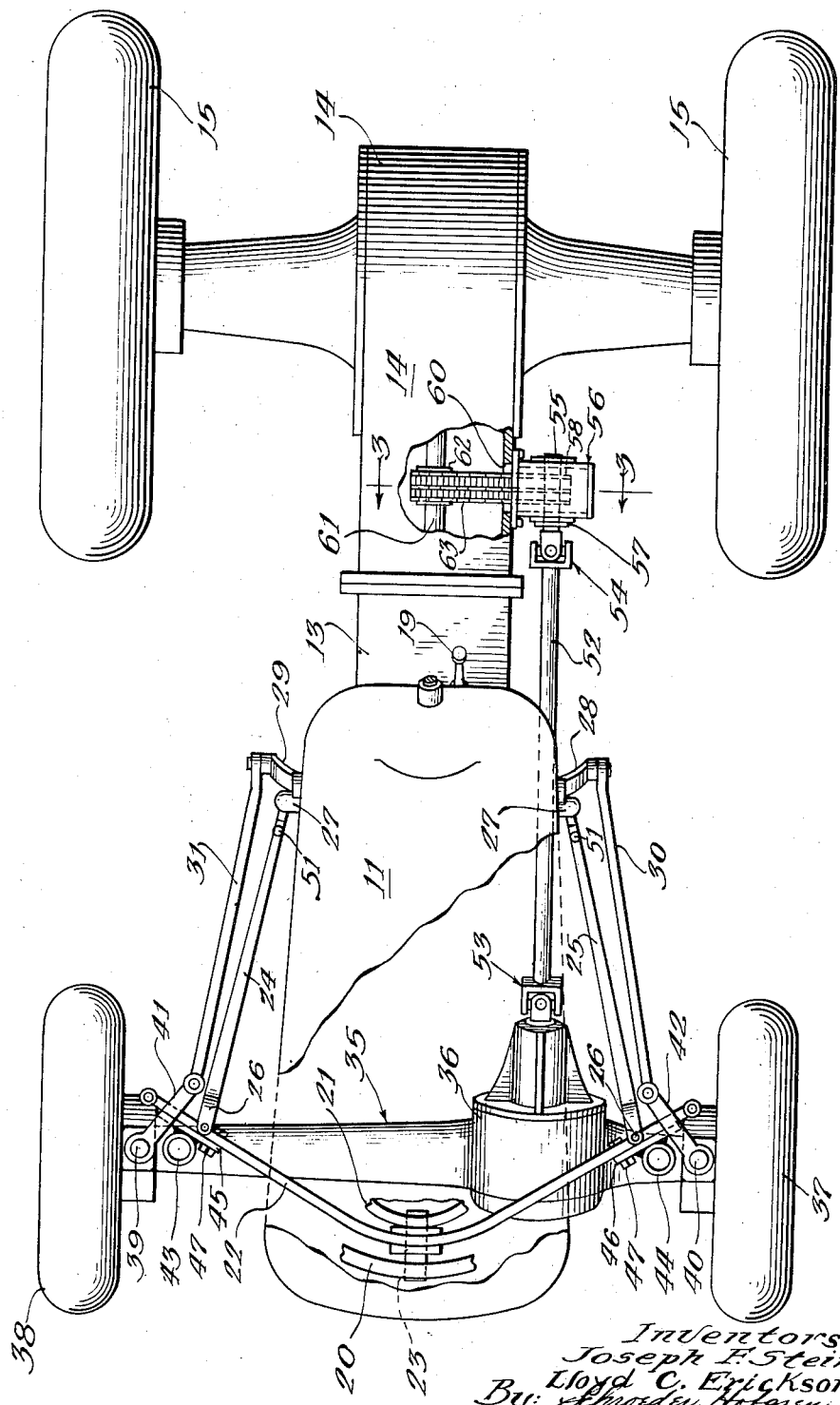

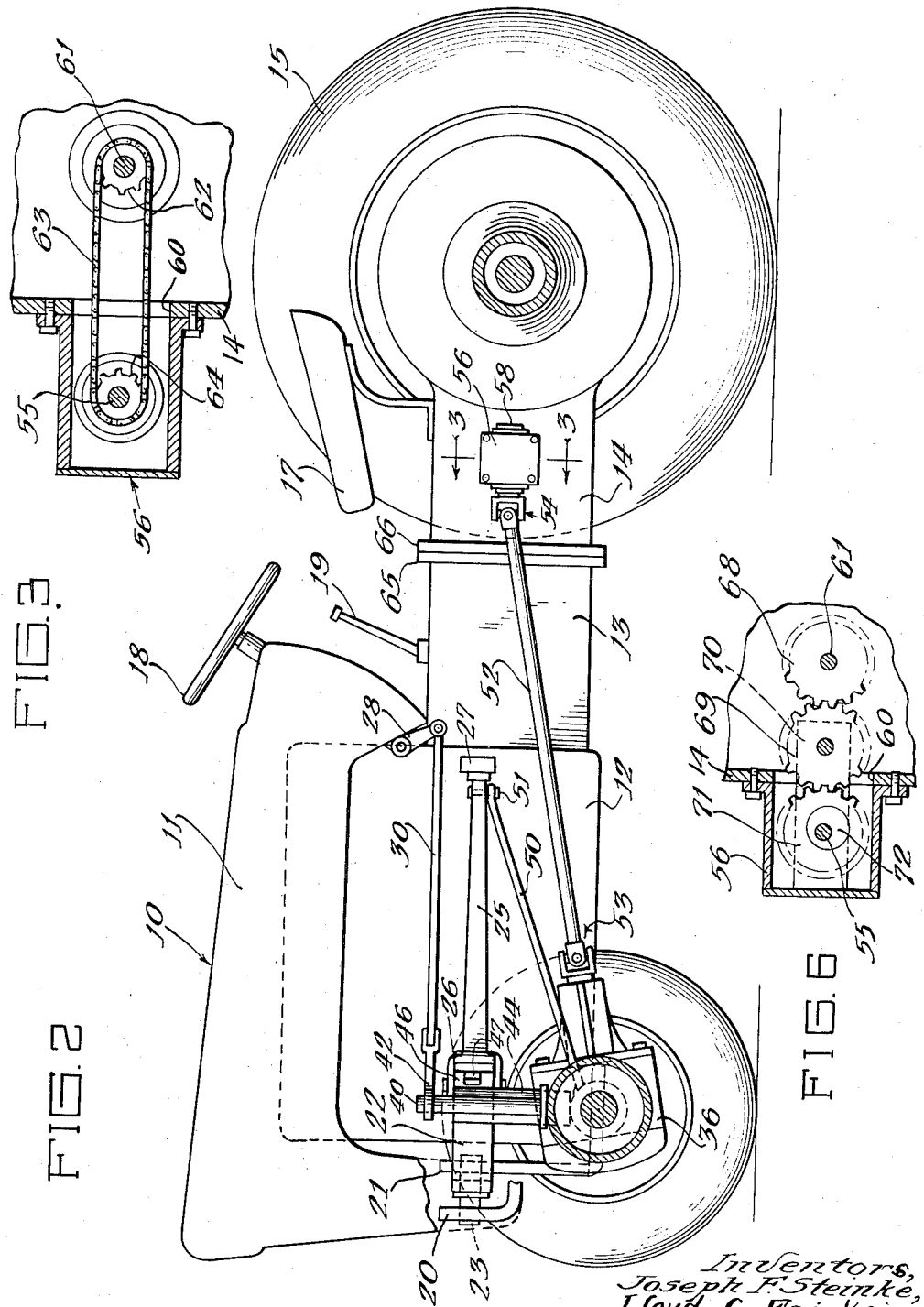

Oct. 7, 1958    J. F. STEINKE ET AL    2,855,063
DRIVE ATTACHMENT FOR CONVERTING A TWO WHEEL
DRIVE TRACTOR TO A FOUR WHEEL DRIVE
Filed Oct. 15, 1956    3 Sheets-Sheet 3

Inventors,
Joseph F. Steinke,
Lloyd C. Erickson
By: Schroeder, Hofgren,
Brady & Wegner
Attorneys

United States Patent Office 2,855,063
Patented Oct. 7, 1958

2,855,063

DRIVE ATTACHMENT FOR CONVERTING A TWO WHEEL DRIVE TRACTOR TO A FOUR WHEEL DRIVE

Joseph F. Steinke and Lloyd C. Erickson, Elwood, Ill.

Application October 15, 1956, Serial No. 616,013

4 Claims. (Cl. 180—44)

This invention relates to an attachment for a tractor and more particularly to a conversion unit for converting an ordinary 2 wheel drive tractor to one having a 4 wheel drive.

Most farm tractors and tractors for general utility use have driven rear wheels for moving the tractor about. This is usually sufficient and adequate for most farming purposes except under the more extreme conditions, such as are encountered with loose or wet ground. In recent years a great deal of additional equipment has been designed and manufactured for use with the tractor unit. Hydraulically powered cranes, lifts, scoops, front end loaders and specialized equipment, such as tree planters, have been made for use with a basic tractor. Most of the additional units which have been made for tractors are attached to the front and are supported primarily on the front axle or front wheels of the tractor. In lifting a load spaced in front of the front wheels of the tractor, the rear wheels have often been raised or sufficiently relieved of pressure against the ground so that the tractor could not be moved. It is with this latter situation that the present invention is particularly advantageous. Additionally, the attachment of the present invention permits a given tractor unit to have more draw bar pull for a given motor. The particular advantageous feature of the present attachment is that it may be easily removed from the tractor when not needed or desired, and yet may be quickly attached for use when needed or desired.

It is the primary object of this invention to provide a new and improved front wheel drive attachment for a tractor.

Another object is to provide an easily and readily attached and removed unit providing a front wheel drive for a tractor.

Another object is to provide a conversion unit for a tractor supplying driven front wheels which may be attached to the main drive train of the tractor without cutting the frame of the tractor.

A further object is to provide a front wheel drive for a tractor which will operate sufficiently and successfully without a differential between the drives to the front and rear wheels of the tractor.

Figure 5:
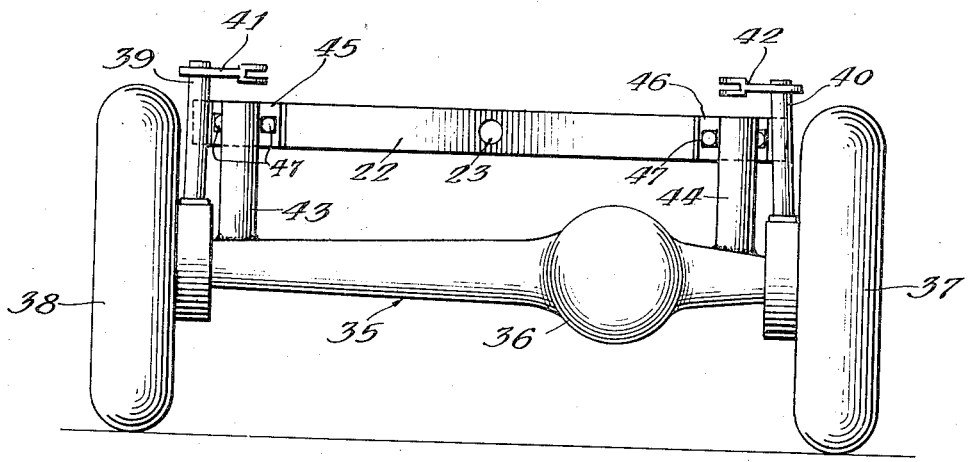

Other features, objects and advantages of the invention will be apparent from the following description of a preferred embodiment of the invention illustrated in the drawings, in which;

Figure 1 is a top plan view of a tractor equipped with the attachment of this invention with parts of the tractor removed and other parts cut away to show the attachment, Figure 2 is a side elevational view of the attachment in position upon a tractor shown diagrammatically in part and in phantom in part, Figure 3 is a fragmentary sectional view taken substantially along line 3—3 indicated in both Figures 1 and 2, Figure 4 is a front elevational view of the tractor with the attachment of this invention therein, Figure 5 is a view of the attachment removed from the tractor substantially as illustrated in Figure 4, and Figure 6 is a view similar to Figure 3 showing an alternate drive employing gears.

The tractor chosen for illustrating the invention is one conventionally known as a Ford tractor to which many appurtenances have ordinarily been attached for handling special jobs. A great variety of equipment has been attached to the tractor and operated hydraulically from pumps powered with the engine of the tractor. All such attachments which are secured to the front of the tractor and pick-up loads have a tendency to balance the tractor about its front wheels. As soon as pressure is relieved from the rear wheels the tractor ordinarily cannot be moved.

As illustrated in the drawings, the tractor has an engine compartmet 10 covered by hood 11 and the motor block 12 is connected with cast parts 13 and 14, the latter including a housing for a differential (not shown) on the rear axle leading to rear wheels 15. Ordinarily, the tractor is equipped with rubber tires on the wheels 15 of considerable diameter, for instance, of the order of 50" upward. The front of the hood 10 includes a radiator 16 for the tractor as is the usual practice, and the driver may sit upon a seat 17 controlling the movement of the tractor with a steering wheel 18 and gear shift 19 as well as other foot controls which have been omitted for purposes of clarity in illustrating the attachment of this invention. The tractor is generally equipped with a relatively heavy frame member 20 at the front of the tractor spaced forwardly from a similar frame member 21, in between which is pivotally mounted a front axle bar 22 by means of pin 23. The front axle bar may pivot on the pin 23 and extends outwardly and slightly rearwardly for the purpose of supporting front wheels for the tractor. The bar 22 is provided with bolt holes and the front wheels ordinarily supplied with the tractor are each independently bolted to the bar 22. The frame members 20 and 21 in which the front axle bar is mounted are quite heavy and ordinarily provide the base to which many attachments are secured. For instance, front end scoops and loaders are generally attached to these frame members so that their weight may be transferred almost directly to the front wheels of the tractor.

Movement of the front axle bar 22 is restrained to swinging about the pivot pin 23 by radius rods 24 and 25 which extend from a bifurcated portion 26 connected to the bar 22 to a connection boss 27 on the side of the tractor frame. Since the radius rods are secured to the front axle bar and to the frame, the bar is permitted to rock on its pivot pin 23 but the ends are prevented from moving longitudinally of the tractor frame.

The steering of the usual front wheels is by the steering wheel 18 through a gear reduction steering mechanism (not shown) to crank arms 28 and 29 connected in turn with drag links 30 and 31 connected at their forward ends to steering arms for turning the wheels. The same steering mechanism, crank arms and drag links are used in the present invention as are provided in the usual tractor structure.

It should be understood that the original equipment, individual front wheels of the tractor are removed by unbolting them from the axle bar 22 and the steering arms are disconnected from the drag links 30 and 31 so that the conversion unit of this invention may replace the usual front wheels. The front wheel drive attachment unit of this invention includes a front axle 35 having a housing 36 for a differential unit between the drive input and the axles leading to front wheels 37 and 38 which are driven from the axle shafts (not shown) within the housing. The front wheels are of the type that may be steered as well as driven, thus steering bars 39 and 40 extend upwardly so that steering arms 41 and 42 may be attached to them in position for connection to the drag links 30 and 31. The positioning of the arms 41 and 42 is such that their inner ends will be in the same position as the original steering arms of the tractor. The steering ratios in the gears from the steering wheel 18 thus need not be changed at all in order to steer the driven front wheels of the present invention.

The front axle is attached to the tractor by providing supports on the axle of a proper height to support the front of the tractor in the same position at which it would have been supported by the original wheels. In order to accomplish this, upright supports 43 and 44 are welded to the housing of the axle so as to extend upwardly to the front axle bar 22. Preferably these supports are made tubular for added strength. Plates 45 and 46 are respectively welded to the uprights in position to be bolted as by bolts 47 to the axle bar 22. The uprights support the front of the tractor on the axle of the front drive unit. Since the axle is below the bar and is intended to pull the tractor, additional bracing is provided in the form of an additional radius rod 50 extending from the base of the vertical tubular support to a position near the rearward end of the radius rod 25 wherein a clamp 51 secures it thereto. These additional braces, one at either side, help transfer the draft of the front axle drive to the tractor frame.

In the present attachment unit a drive is accomplished from the main drive of the tractor to the front axle without the necessity of interposing a differential between the drive of the front axle and that to the back axle. It has heretofore been considered necessary to provide for free slippage between the front and rear driven wheels in order to prevent binding and "wind-up" of one axle relative to the other. In the present invention a drive shaft 52 is carried from the front differential 36 through a universal joint 53 and a rear universal joint 54 to a jack shaft 55 mounted on the exterior of the tractor in its own housing 56. The jack shaft is supported in bearings 57 and 58 and the housing is bolted to the tractor frame part 14 over an opening 60 normally used for passing an oil dip stick into the housing. A short pinion shaft 61 in the main tractor drive from the engine to the rear axles may be provided with a sprocket 62 so that a chain 63 may pass over that sprocket and a similar sprocket 64 on the jack shaft. It is ordinarily thought that the number of chains and size of chains which could be employed would be inadequate but it has been found that the opening 60 in the tractor is generally sufficiently large to accommodate a chain strong enough to drive the entire tractor through the front axle alone.

The installation of the drive for the front wheels may be easily accomplished since the tractor may be separated just ahead of the pinion shaft 61 at the mating flanges 65 and 66 between parts 13 and 14 of the tractor. The pinion shaft 61 is splined at both ends so that it may easily be withdrawn and the sprocket 62 welded thereon in proper position. A kit which includes the entire front wheel drive attachment is however provided with a substitute pinion shaft with a sprocket already positioned thereon. A mere substitution of the pinion shaft in the tractor is thus required.

The housing 56 for the jack shaft as well as the universal joint 54, is ordinarily covered with a removable metal cover (not shown) so that clothing of a workman will not be caught in the revolving parts. In certain farm operations such as cultivating, the front wheels of the tractor must be spread to a greater extent than is necessary with plowing or general utility operations. Ordinary row crop operations are generally conducted with the wheels set 76" apart in order to straddle the rows. The front wheel drive unit is generally provided with the illustrated tractor at the standard 52" spacing. Obviously therefore, the attachment should be removed and the original wheels substituted for certain uses. In order to quickly remove the unit, it is only necessary to unbolt the rear universal joint 54, the steering drag links and the upright supports of the front axle. Once the pinion shaft 61 with the sprocket thereon has been placed in the tractor, no further modification is necessary. The jack shaft 55 can turn harmlessly when the front axle drive unit is not in use.

It has been found that the ratio of drive to the front and rear wheels of the tractor may be selected within limits such that no binding between the parts occurs. A change in the size of sprocket and the number of teeth thereon may easily be made on the jack shaft if necessary. It is known that wear of the tires used on the tractor effects a change in the ratio. It has been found however that the tires may be quite unevenly worn without requiring a change in the sprocket on the jack shaft.

In an alternative form of drive to the shaft 52 for the front axle, gears may be substituted for the chain drive. As illustrated in Figure 6, a gear 68 is placed on the pinion shaft so as to mesh with an idler gear 69 supported in bearings on cantilevered plates 70 supported on the housing 56. A gear 71 is supported on an eccentric bearing 72 on the jack shaft 58 so that a gear 71 having a different number of teeth may be substituted. The bearing will allow shifting the center of the gear 71 enough to accommodate a slight change in gear size because of a different number of teeth and still keep the gears in proper mesh.

The attachment unit of this invention permits a tractor to have considerably greater use, particularly when the tractor is equipped with heavy attachments operating in front of the front axle. Even through a load may be sufficiently heavy to raise the rear wheels of the tractor off the ground, the operator can still move his tractor and load through the drive to the front wheels. In such instances, the rear wheels will turn harmlessly and ineffectively. It has also been found that in farming operations, a front wheel drive gives considerably more draw bar pull for operations such as plowing. Ordinarily, an additional bottom may be added to the plow unit by the mere addition of the front wheel drive unit. It has also been found that the unit is particularly useful in soft or loose ground. The front of the tractor is then generally pulled around corners rather than pushed as is the usual practice, avoiding excessive cutting into the ground.

The foregoing detailed description has been given for clearness of understanding only, and no unnecessary limitations should be understood therefrom, for some modifications will be obvious to those skilled in the art.

We claim:

1. A front drive axle attachment for a tractor, comprising: an axle housing having axles therein drivingly connected to steerable wheels mounted thereon; means secured to said steerable wheels and adapted to be attached to the steering mechanism of the tractor; mounting means for removably securing the axle to the tractor in substitution for the usual idler front wheels of the tractor, said mounting means including upright standards secured to the axle housing with a mounting plate on each of the standards, each of said plates being adapted for bolted connection to a wheel mounting cross bar on the tractor; and power transmission means for driving said front wheels including a shaft drivingly connected to said axles and a jack shaft drivingly connected to said shaft, said jack shaft having a supporting housing adapted for connection to the tractor in position to receive driving power from the main drive train of the tractor.

2. A front axle drive attachment as specified in claim 1 wherein the housing for the jack shaft is bolted to the outer surface of the tractor and supports gears for connecting the jack shaft with the main drive of the tractor.

3. A front axle drive attachment as specified in claim 1 wherein the housing for the jack shaft is secured to the tractor in position to receive a driving chain from the tractor main drive to the jack shaft.

4. A front drive attachment for a tractor having idler front wheels, comprising: an axle housing having steerable wheels thereon and driving axles therein attached to the wheels; steering arms connected with the wheels for connection with steering gear of the tractor; supporting standards on said axle housing each extending generally upright and having a mounting plate at its upper end, said mounting plates being adapted for bolted connection to front suspension means of the tractors; a drive shaft connected with said front axles and a jack shaft connected to said drive shaft, said jack shaft having a supporting housing adapted for connection to the tractor; and a drive train connected to the jack shaft for receiving driving force from the tractor, said drive train including a pinion shaft adapted for insertion into the tractor main drive.

References Cited in the file of this patent

UNITED STATES PATENTS

| | | |
|---|---|---|
| 2,132,545 | Smith | Oct. 11, 1938 |
| 2,162,334 | Herrington | June 13, 1939 |
| 2,631,681 | Utz, et al. | Mar. 17, 1953 |

FOREIGN PATENTS

| | | |
|---|---|---|
| 184,831 | Austria | Feb. 25, 1956 |